United States Patent [19]

Kawasaki et al.

[11] 4,291,522
[45] Sep. 29, 1981

[54] MOWER MOUNTED ON VEHICLE

[75] Inventors: Masami Kawasaki; Hirofumi Sadakane, both of Sakai, Japan

[73] Assignee: Kubota Ltd., Osaka, Japan

[21] Appl. No.: 134,322

[22] Filed: Mar. 26, 1980

[30] Foreign Application Priority Data

Apr. 10, 1979 [JP] Japan .............................. 54-47997[U]
Aug. 20, 1979 [JP] Japan ........................... 54-115125[U]

[51] Int. Cl.³ ........................................... A01D 35/12
[52] U.S. Cl. ..................................... 56/15.8; 56/17.1; 56/DIG. 22
[58] Field of Search ...................... 56/15.8, 17.1, 17.2, 56/DIG. 22

[56] References Cited

U.S. PATENT DOCUMENTS 3,706,188  12/1972  Quiram .................................. 56/15.8
3,874,150  4/1975   Boeck ................................... 56/17.1

FOREIGN PATENT DOCUMENTS

206240  2/1957  Australia .............................. 56/17.2
522534  3/1956  Canada ................................. 56/25.4

*Primary Examiner*—Robert A. Hafer
*Attorney, Agent, or Firm*—Armstrong, Nikaido, Marmelstein, & Kubovcik

[57] ABSTRACT

A mower comprising a mower frame attached to the bottom of a vehicle body, cutting blades rotatably supported by vertical shafts on the mower frame, a drive assembly on the frame for rotating the blades, arms supported on the frame and pivotally movable upward or downward, gauge members supported by the free ends of the pivotal arms, an operating member operatively connected to the pivotal arms for pivotally moving the arms, and locking means for disengageably holding the operating member. The mower frame is upwardly or downwardly movable by the movement of the pivotal arms with the gauge members in engagement with the ground to position the cutting blades at the desired level. The blades are retainable at this level by the locking means.

7 Claims, 14 Drawing Figures

MOWER MOUNTED ON VEHICLE

BACKGROUND OF THE INVENTION

This invention relates to a mower mounted on a tractor or like vehicle.

As is well known, a rotary mower attached to the bottom of the frame of a vehicle, such as a tractor, performs the contemplated work while the vehicle travels on the ground. The mower is equipped with grass cutting rotary blades supported by the frame of the mower and each rotatable about a vertical shaft and with gauge members for maintaining the cutting blades at a constant level above the ground during travel.

On the other hand, the position of the mower frame is vertically adjustable relative to the gauge members to enable the blades to cut grass at an altered constant level.

With such mowers heretofore known, the cutting blades are adjusted to the desired level along with the mower frame by shifting the gauge members upward or downward with replacement of pins or bolts. Thus it is not easy to alter the grass cutting height, while it is impossible to immediately vary the cutting height during operation. Further when the mower is provided with a gauge member at each end of the mower frame, it is impossible to adjust both the gauge members at the same time, so that the gauge members must be adjusted individually by a cumbersome procedure.

For the adjustment of the level of the mower frame, the mower frame is usually provided with pivotal arms each of which is upwardly or downwardly movable about a lateral pin and has a vertical rod supporting a gauge member freely turnably about the rod. Thus the cutting blades are made adjustable to the desired level by the pivotal movement of the pivotal arms. Although this arrangement is simple, the movement of the pivotal arms about the lateral pins for altering the cutting height also moves the vertical rods to an inclined position. With the vertical rods thus inclined, the gauge members have difficulties in retaining their stable forwardly oriented position, failing to accurately follow the vehicle, such as tractor, and entailing operational troubles. Further when the gauge member idly turns about the vertical rod in an inclined position, the cutting blades on the mower frame, as well as the frame per se, will be brought to an altered level, consequently producing irregularities in the cutting height and undesirable work results.

In the case where the mower comprises an upwardly or downwardly movable frame attached to the bottom of the body of a vehicle, a drive assembly for receiving power from the drive source of the vehicle to drive the cutting blades, and a transmission box mounted on the mower frame as projected therefrom and provided for the drive assembly, the lift of the mower is limited because the transmission box will come into contact with the vehicle body, consequently limiting the cutting height. It is then impossible to hold the mower raised at a sufficient distance from the ground during the travel of the vehicle. The mower is therefore likely to strike some obstacle, or the cutting blade will contact the ground and become damaged when it is moved upward or downward for adjustment or when it is in operation.

SUMMARY OF THE INVENTION

An object of the present invention is to provide a mower comprising cutting blades and a mower frame supporting the blades which are adjustable by a common operating member to the desired cutting level with ease even when the mower frame is provided at its opposite ends with gauge members, the operating member being lockable to hold the cutting blades at the desired adjusted level a constant distance above the ground and to maintain a uniform cutting height.

Another object of the invention is to provide a mower equipped with locking means which is simple and reliable to operate to hold the cutting blades in a position a constant distance above the ground and to maintain a uniform cutting height.

Another object of the invention is to provide a mower comprising pivotal arms supported on the frame of the mower and pivotally movable upward or downward, gauge members supported by vertical rods on the free ends of the pivotal arms and idly turnable about the vertical rods, the cutting blades upwardly or downwardly movable by the movement of the pivotal arms with the gauge members in engagement with the ground, the vertical rods being retainable in the same vertical position when the cutting blades are moved upward or downward to hold the cutting blades at an adjusted level without shifting even when the gauge member idly turns about the vertical rod, the mower thus assuring a uniform cutting height while permitting the gauge member to smoothly and accurately follow the travel of the vehicle on which the mower is mounted.

Another object of the invention is to provide a mower mounted on a vehicle and comprising cutting blades and a cutting blade drive assembly mounted on the frame of the mower and including a transmission box, the transmission box being arranged not to interfere with the body of the vehicle when the cutting blades are moved upward or downward for adjustment, the mower thus being made liftable to a higher level to assure a sufficiently high cutting height and thereby rendered operable with high stability free of damage when the vehicle travels along with the mower attached thereto.

Still another object of the invention is to provide a mower including cutting blades which are protected from the ground free of contact therewith when the blades are moved upward or downward for adjustment or when the blades are in operation for cutting down grass or the like.

DETAILED DESCRIPTION OF THE INVENTION

FIGS. 1 to 7 show a first embodiment of the invention as attached to a vehicle which is a tractor. The body 1 of the tractor is provided with front wheels 2, rear wheels 3, a bonnet 4, a steering wheel 5 and a driver's seat, and further has steps 7 and mower mounting brackets 8 which are provided on both sides of the body 1 approximately in the midportion thereof. Detachably mounted on the body 1 at a front lower portion thereof is a front power take-off unit 9 coupled to a front PTO shaft projecting forward from the engine.

Figure 1:
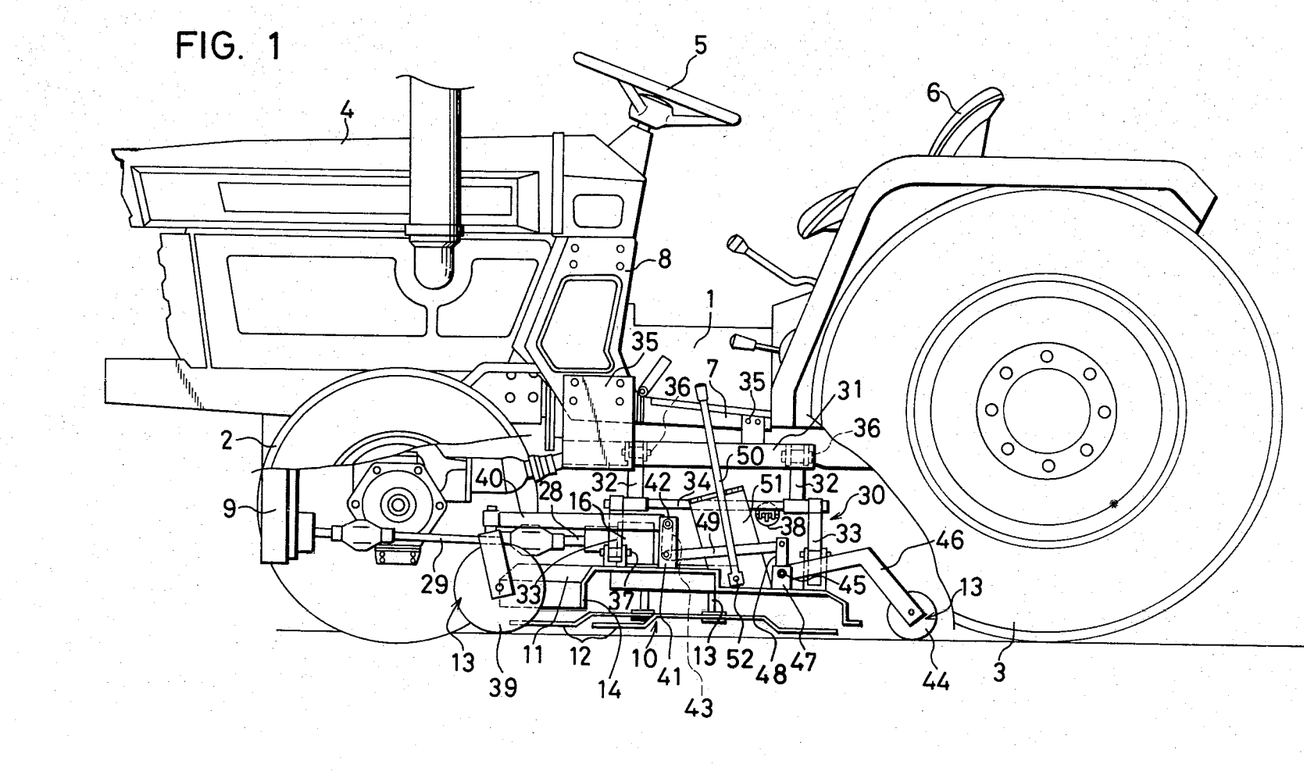
FIG. 1 is a side elevation showing a first embodiment of the invention as it is mounted on a tractor.
Figure 2:
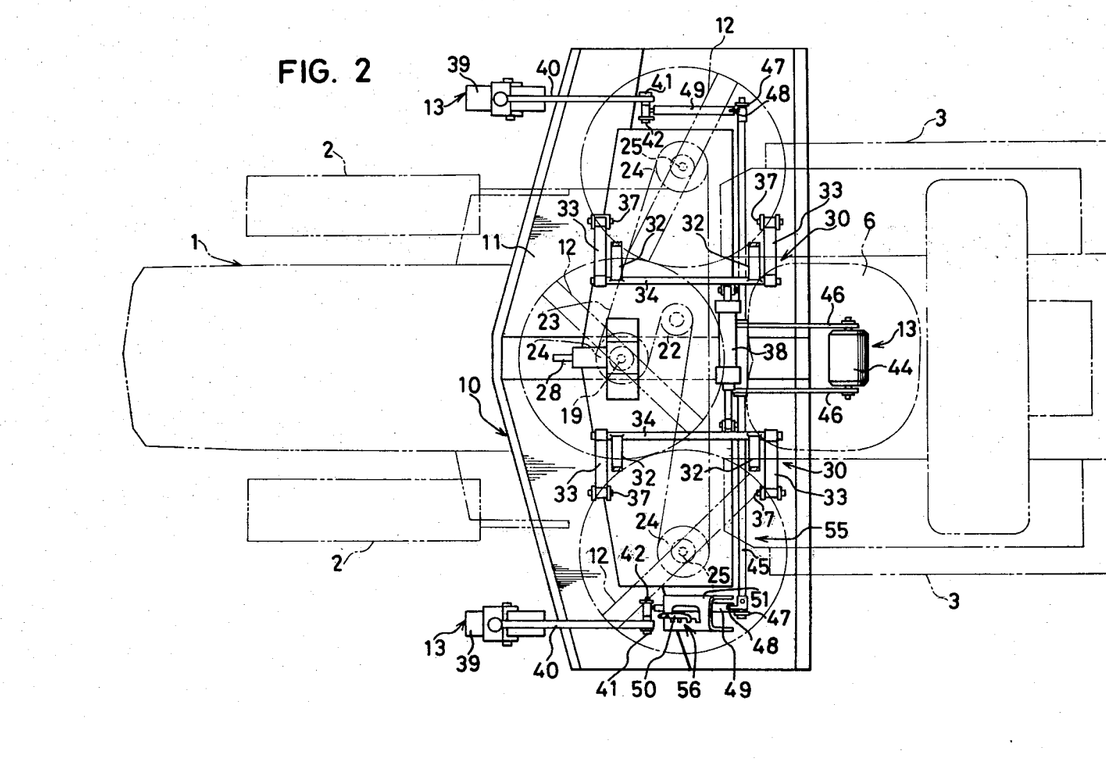
FIG. 2 is a plan view showing the mower.
Figure 3:
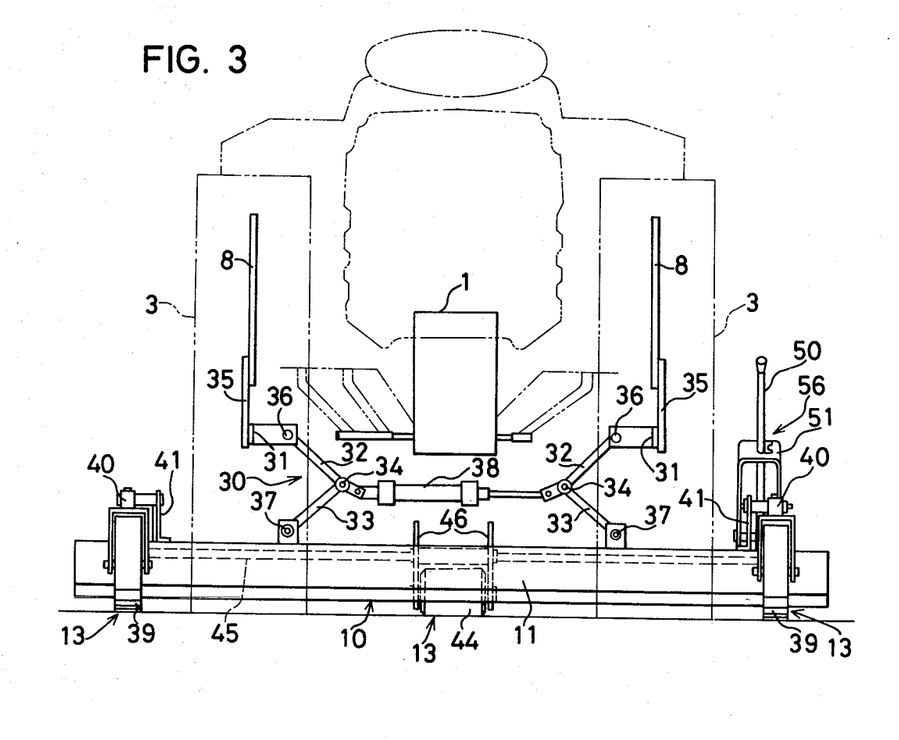
FIG. 3 is a front view showing the mower.
Figure 4:
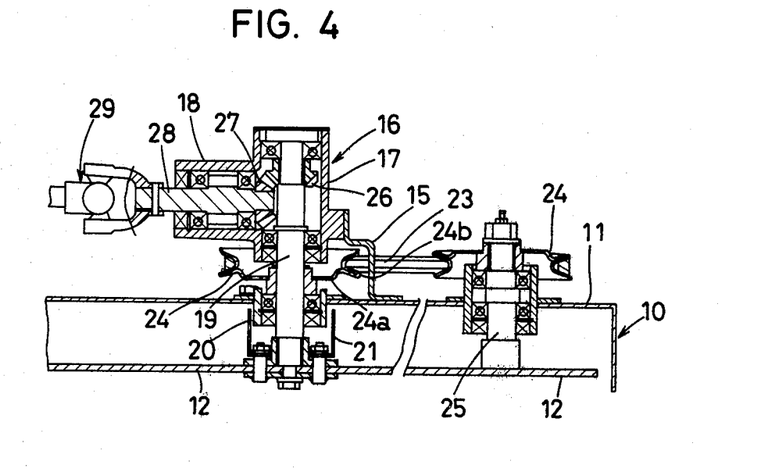
FIG. 4 is an enlarged view in vertical section showing a transmission box assembly of the same.

Attached to the bottom of the body 1 is the present embodiment, namely, mower 10 consisting essentially of a mower frame 11, cutting blades 12 supported by the mower frame 11 and each rotatable about a vertical shaft, and gauge members 13 for adjusting the level of the mower frame 11. As seen in FIG. 2, the mower frame 11 has a front portion resembling an arrow head when seen in plan and opposite ends extending outward sidewise of the tractor to provide a slightly elevated discharge guide channel 14. The front portion extends into a stepped lower horizontal rear portion. A transmission box 16 is fixedly disposed on the mower frame in the center to the front of the horizontal portion as seen in FIG. 4. The box 16 attached to the frame by a stay 15 comprises a vertical hollow cylinder 17 and a forward hollow cylinder 18 in a T-shaped arrangement.

The vertical cylinder 17 has a lower end at some distance above the mower frame 11. A main shaft 19 for the cutting blades 12 is housed in the cylinder 17 as supported at upper and lower two portions, extends through a bearing case 20 fixed to the mower frame 11 and projects downward into the frame 11. One of the cutting blades 12 having a protective cover 21 is splined to the lower end of the main shaft 19 for rotation therewith.

The remaining pair of cutting blades 12 are coupled to the main shaft 19 by a belt 23 passed along a tension pulley 22. For this purpose a transmission pulley 24 made of metal plate is fixedly mounted on the main shaft 19 and positioned in the space between the box 16 and the frame 11. Similarly transmission pulleys 24 of metal plate are secured to the shafts 25 of the other blades 12. The pulley 24 is made up of a dish-shaped base plate 24a and a V-grooved belt receiving member 24b integral therewith at an overlapping portion.

The main shaft 19 fixedly carries a driven pinion 26 for receiving torque. A drive pinion 27 meshing with the pinion 26 is secured to the rear end of a pinion shaft 28 rotatably housed in the forward cyllnder 18, whereby the power from the front power take-off unit 9 is delivered vertically downward. The power from the unit 9 is delivered through a flexible universal joint 29 to the pinion shaft 28. The drive assembly for the cutting blades 12 consists essentially of the transmission box 16, main shaft 19 and pinion shaft 28 described above.

The mower 10 is upwardly or downwardly movably supported by the tractor body 1 by means of a pair of lifting link mechanisms 30 disposed symmetrically on opposite sides of the body 1. Each of the link mechanisms 30 comprises a fixed bracket 31, upper links 32, lower links 33 and a connecting rod 34. The fixed bracket 31 is detachably attached to the mounting bracket 8 and to the step 7 by a pair of front and rear brackets 35. The upper links 32, as well as the lower links 33, are provided in pair, one positioned to the rear of the other. Each of the upper links 32 has an upper end pivoted by a pin 36 to an inner portion of the fixed bracket 31 and a lower end fixed to the connecting rod 34 close to each of its front and rear ends. The lower links 33 have upper ends turnably fitting around the front and rear ends of the connecting rod 34 and lower ends pivoted to the mold frame 11 by pins 37. A lifting hydraulic cylinder 38 is connected between the pair of connecting rods 34.

Figure 7:
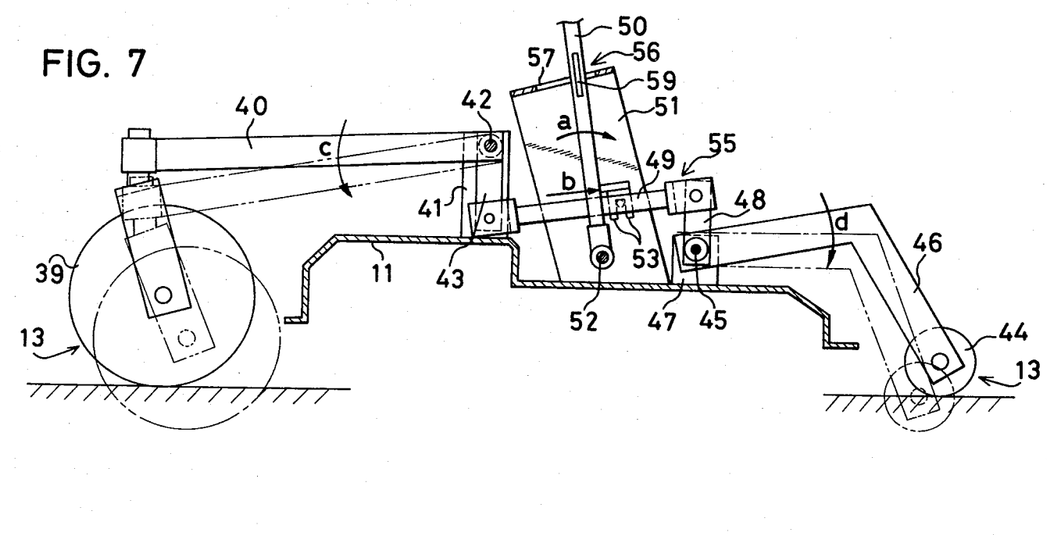
FIG. 7 is an enlarged view partly in section and showing a gauge member support assembly in FIG. 1.
Figure 8:
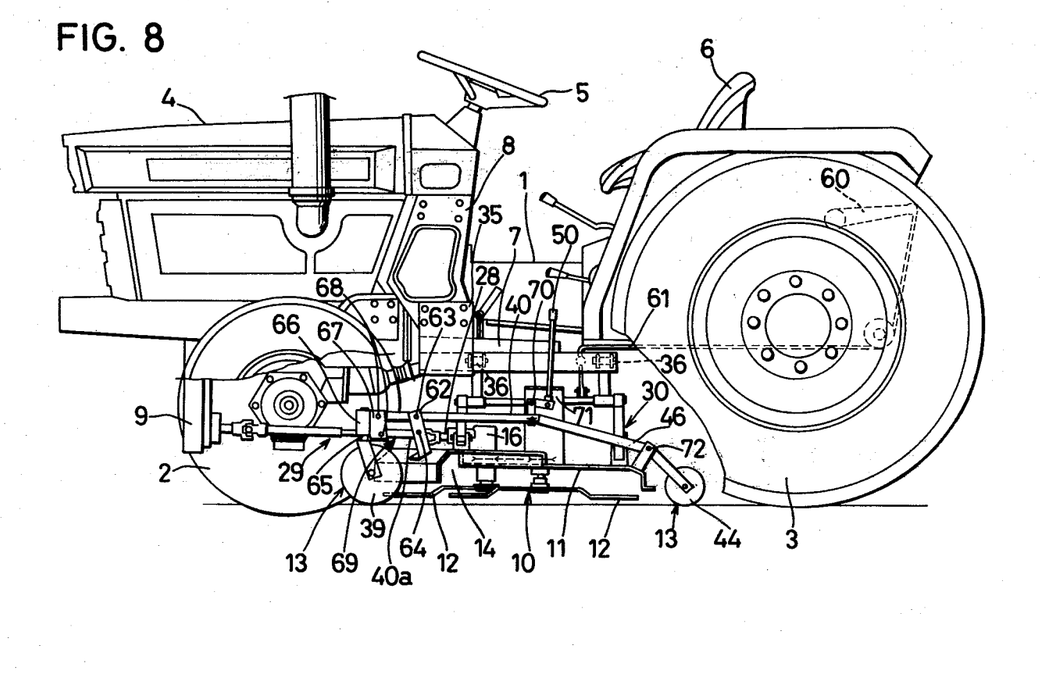
FIG. 8 is a side elevation showing a second embodiment of the invention as mounted on a tractor.

A pir of front gauge wheels 39 are disposed to the front of opposite ends of the mower frame 11 respectively. Each of the front gauge wheels is of caster construction and is supported by the front end of each front pivotal arm 40. As also shown in FIG. 7, the front pivotal arm 40 is upwardly or downwardly turnably supported by a pin 42 on a bracket 41 fixed to each of opposite end portions of the mower frame 11. The arm 40 is provided at its base end with a coupling link 43 extending downward.

To the rear of the center of the mower frame 11 is disposed a rear gauge wheel 44 which is supported by a pair of rear pivotal arms 46 secured to a coupling rod 45. These front and rear gauge wheels 39 and 44 are the gauge members 13.

The coupling rod 45 extends transversely of the tractor body and is supported by brackets 47 at rear portions of the mower frame 11. Coupling links 48 extend upward from both ends of the rod 45 and are positioned to the rear of the coupling links 43 for the front pivotal arms 40. The links 48 are operatively connected to the links 43 by connecting bars 49 extending longitudinally of the tractor.

Figure 5:
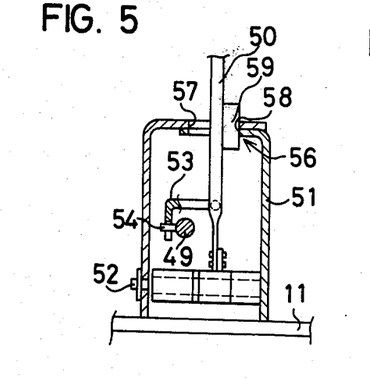
FIG. 5 is a front view in section showing an operating lever of the same.
Figure 6:
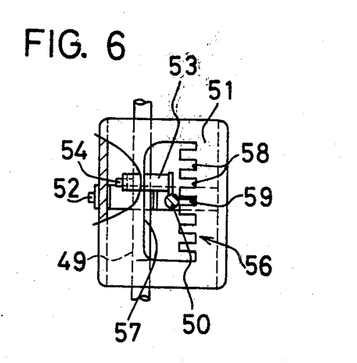
FIG. 6 is a plan view partly broken away and showing the lever.

Indicated at 50 is an operating lever, i.e. lifting or lowering operating member for adjusting the level of the cutting blades 12. The lever 50 is provided for one of the connecting bars 49 and forwardly or backwardly pivotably supported by a pivot 52 on a guide 51. As shown in FIGS. 5 to 7, the operating lever 50 has a bifurcated engaging member 53 in engagement with a pin 54 fixed to the connecting bar 49. The coupling links 43, 48, coupling rod 45, connecting bars 49, engaging member 53, pin 54, etc. provide a connecting assembly 55 for operatively connecting the front pivotal arms 40 and the rear pivotal arms 46 to the operating lever 50.

Means 56 for locking the operating lever in its operated position comprises an engaging member integral with the guide 51 and having a plurality of indentations 58 communicating with a lever guide aperture 57 and arranged along the direction of turn of the operating lever 50, and an engaging pawl 59 secured to the lever 50 and engageable in one of the indentations 58 by being forced therein with an unillustrated suitable elastic member. The lever 50 is operable by the operator sitting in the seat 6.

The mower operates in the following manner. When lawn or the like is to be mowed, the operating lever 50 is moved forward or backward for the adjustment of the cutting height. When the lever 50 is moved backward about the pivot 52 rearward (in the direction of an arrow a) in FIG. 7, the connecting bar 49 is moved rearward as indicated by an arrow b by virtue of the engagement of the member 53 with the pin 54, pulling the coupling links 43 rearward and, at the same time, pushing the coupling links 48 rearward. This movement turns the front pivotal arms 40 downward as indicated by an arrow c about the pins 42 and also turns the rear pivotal arms 46 about the coupling rod 45 downward as indicated by an arrow d, with the result that the front gauge wheels 39 and the rear gauge wheel 44 move down relative to the mower frame 11 as indicated in phantom lines. Consequently the mower frame 11 is lifted, bringing the cutting blades 12 to a higher level to give an increased cutting height. After the front gauge wheels 39 and the rear gauge wheel 44 have been brought to the desired position by moving the operating lever 50 forward or backward, the pawl 59 on the lever 50 in the desired position is engaged in the opposed one of the indentations 59 in the guide plate 51, thus completely locking the lever 50 by the locking means 56, whereby the adjustment of the mower frame 11 as well as the cutting blades 12 is completed. In this way all the gauge wheels 39 and 44 can be easily adjusted as desired by the single operating lever 50, and the lever 50 is lockable also easily and reliably. Thus the cutting height is very advantageously variable, for example, during operation.

For mowing, the hydraulic cylinder 38 is made free to stretch or collapse, and the mower 10 is lowered in its entirety with the front gauge wheels 39 and the rear gauge wheel 44 brought into contact with the ground. The tractor is driven with the cutting blades 12 rotated in the direction of an arrow e by the power from the front power take-off unit 9. Since the lifting link mechanisms 30 are free to stretch or collapse, the mower moves up and down accurately along the ground level, enabling the cutting blades 12 to cut down grass, lawn or the like at a constant height.

When the hydraulic cylinder 38 is contracted to lift the mower 10, both the link mechanisms 30 flexes by the same amount, raising the mower frame 11 straightly upward.

As the gauge members, sleigh-shaped members are usable in place of the gauge wheels.

FIGS. 8 to 12 show another embodiment which is approximately similar to the foregoing embodiment in construction and operation.

The tractor body 1 is provided at a rear portion with an upwardly or downwardly turnable lift arm 60 for raising or lowering a working implement, such as an unillustrated rotary tiller unit, attached to the tractor by three-point link means. The lifting link mechanisms 30 are vertically stretchable or collapsible with a wire 60 coupling the mechanisms 30 to the lift arm 60.

The mower frame 11 is provided at opposite end front portions with upstanding front stays 62, with a first support rod 63 mounted on their upper ends transversely of the tractor. A second support rod 64 is attached to the stays 62 at intermediate portions thereof below the rod 63.

Each of the front gauge wheels 39 is of the caster type and has a vertical rod 65 turnably housed in a support tube 66, which has on its rear side a connecting plate 67 carrying upper and lower two movable pins 68, 68 for providing parallel links 69 positioned one above the other. The lower of the links 69 is an auxiliary link 40a, while the front end of the front pivotal arm 40 serves as the upper link 69. The rear end of the arm 40 is upwardly or downwardly movable by an operating lever 50 and a coupling link 70 for delivering the turn of the lever 50 to the arm 40 as an upward or downward movement. The arm end is lockable at a suitable level by a guide 51 having a series of wavy indentations 58. The opposed pair of front gauge wheels 39 are coupled by the elongated first support rod 63. The rear gauge wheel 44 is adjustingly movable upward or downward by the rear pivotal arm 46 and a coupling rod 71. Thus the level of the cutting blades 12 is adjustable.

Since the front gauge wheels 39 are movable upward or downward by the parallel links 69, the vertical rod 65 of each front gauge wheel 39 can retain its axis in the same vertical position at all times. Thus even after the adjustment of the level of the mower frame 11, the front gauge wheels 39 are properly operable with stability, accurately following the travel of the tractor. Even when the front gauge wheel 39 idly turns about the vertical pin 65, the mower frame is retainable at the same level without shifting upward or downward because the vertical rod 65 remains in the same vertical position at all times. Thus the cutting blades 12 are held at the adjusted level to assure a uniform cutting height.

Figure 9:
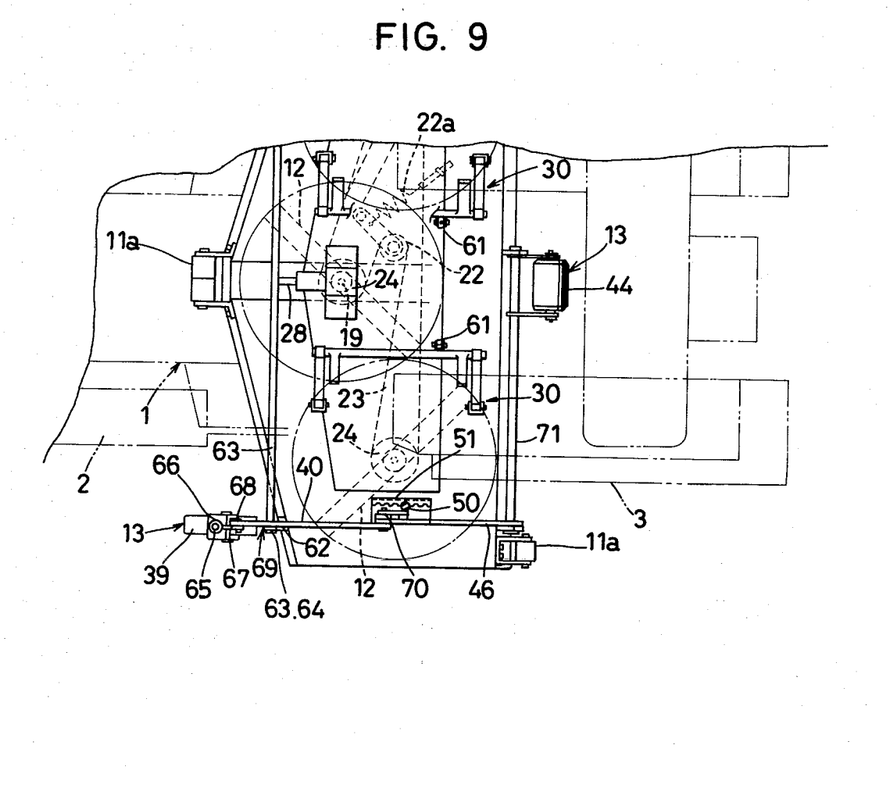
FIG. 9 is a plan view of the mower.
Figure 10:
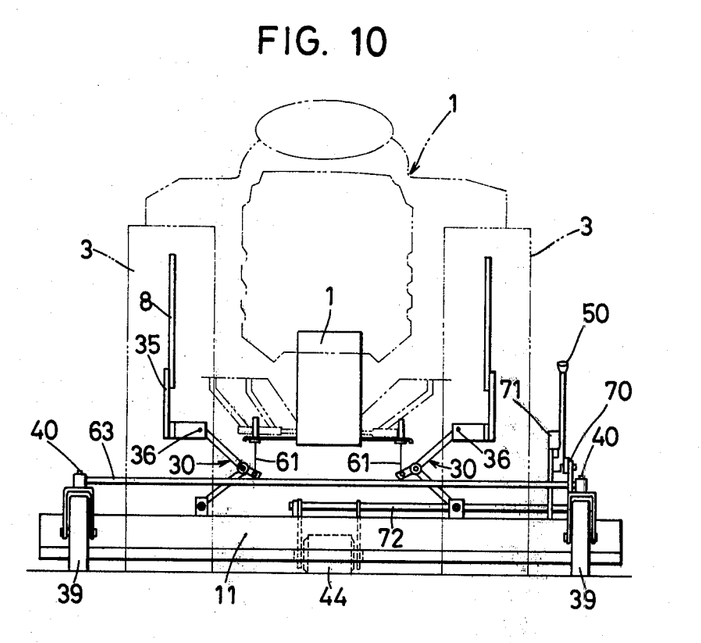
FIG. 10 is a front view of the mower.
Figure 11:
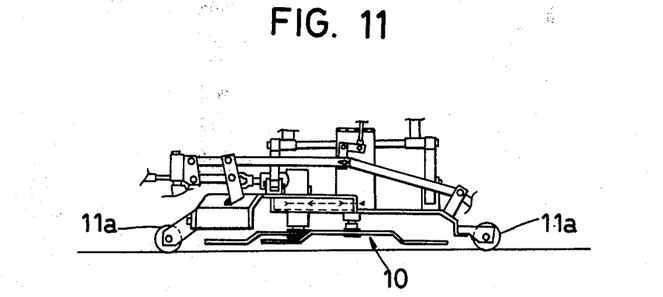
FIG. 11 is a side elevation showing wheels included in the same.
Figure 12:
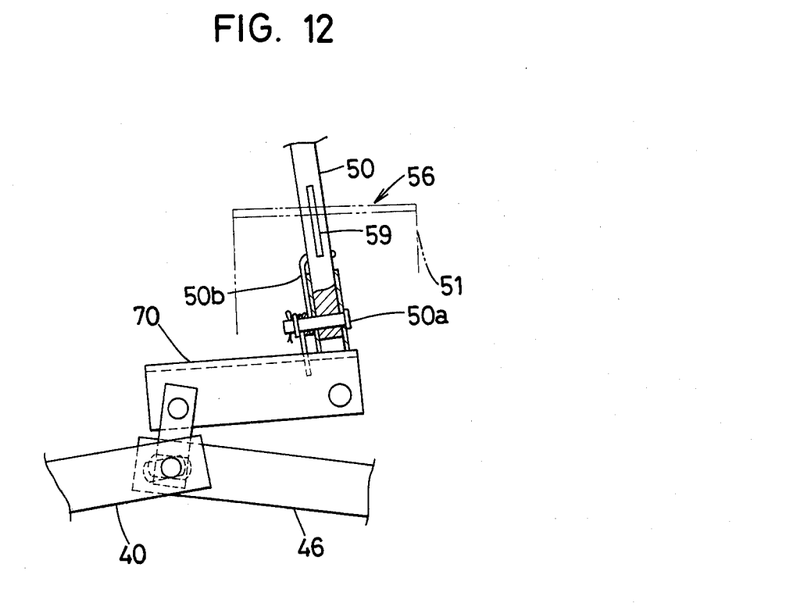
FIG. 12 is an enlarged side elevation showing locking means of the same.

As seen in FIG. 9, the tension pulley 22 is idly rotatable about a vertical pin and is biased by a spring 22a to tension the belt 23. Further as illustrated in FIGS. 9 and 11, wheels 11a, each rotatable on a horizontal shaft, are attached to the mower frame 11 at the midportion of its front edge and at opposite ends of its rear edge. These wheels 11a serve to hold the cutting blades out of contact with the ground and maintain a minimum spacing therebetween, independently of the adjustment of the gauge members 13. FIG. 12 shows a modification of the locking means 56 of the first embodiment. The operating lever 50 is supported by a pin 50a on the coupling link 70 and is laterally turnable. The pawl 59 is held engaged in the indentation 58 by being biased by an elastic member, namely, a coiled spring 50b. This arrangement facilitates the engagement of the pawl 59 in the indentation 58.

Figure 13:
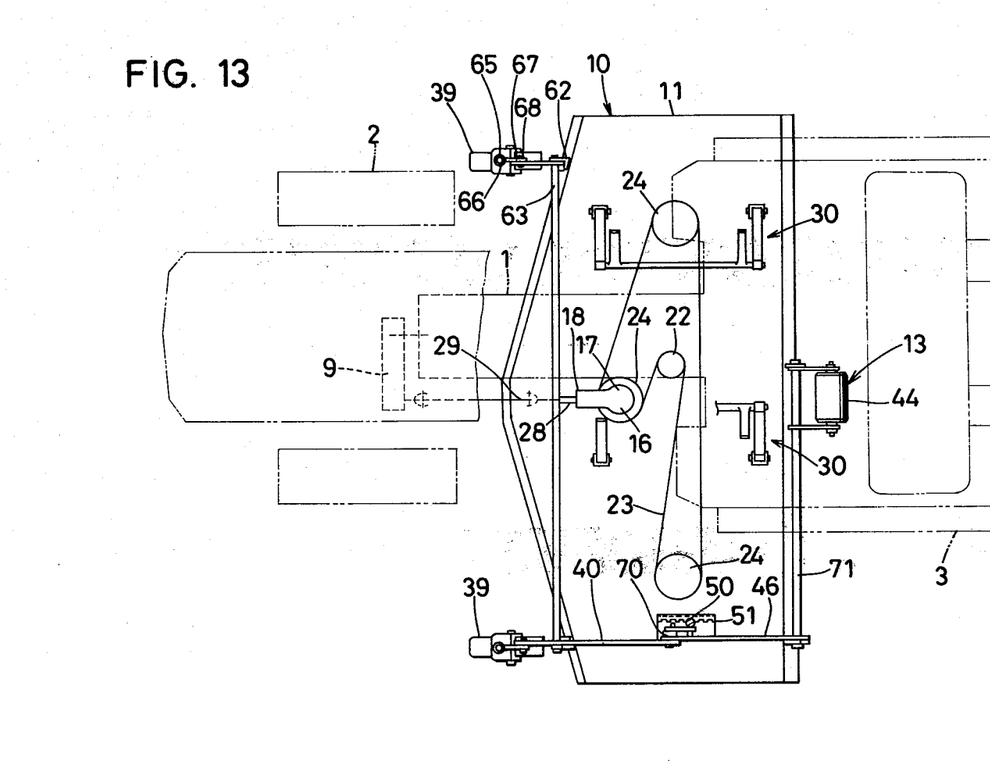
FIG. 13 is a plan view showing a third embodiment.
Figure 14:
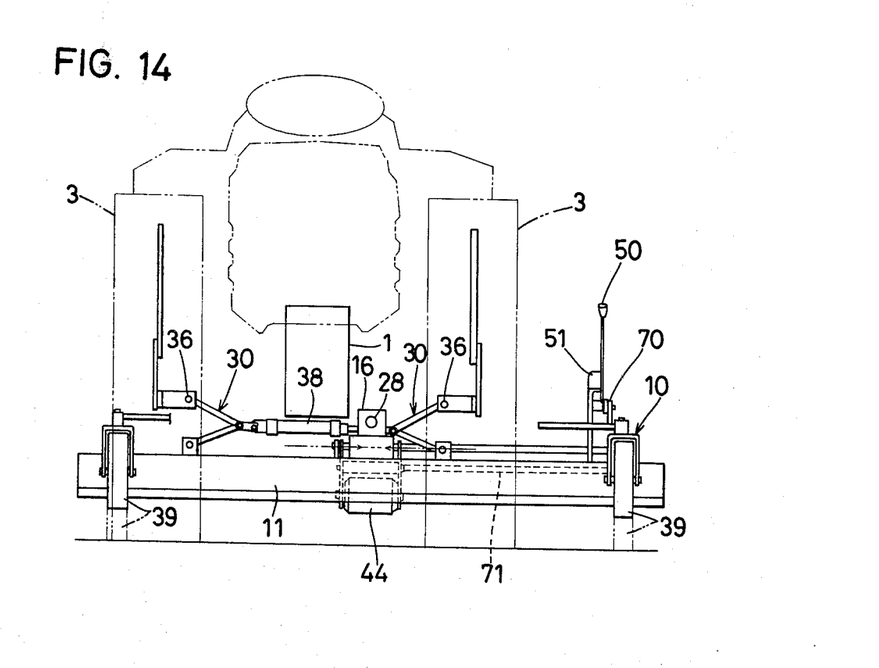
FIG. 14 is a front view showing the same.

FIGS. 13 and 14 show another embodiment substantially resembling the first embodiment. As illustrated, this mower 10 is offset to the left side (or right side). The transmission box 16, mounted on and projecting upward from the mower frame 11, is disposed on one side of the tractor body 1 outwardly thereof in corresponding relation to the clutch housing. This arrangement permits the mower 10 to be raised an increased distance to the full as illustrated in FIG. 12 since the box 16 is liftable without interfering with the body 1. Thus sufficiently large cutting height is available. With the mower 10 retained at a sufficiently high level, the tractor can be driven without any damage to the mower 10 that would otherwise strike some obstacle. With the transmission box 16 positioned outside the body 1, the transmission system can be checked for maintenance very easily and properly.

What is claimed is:

1. A mower mounted on a vehicle and including a mower frame attached to the bottom of the body of the vehicle, cutting blades rotatably supported by the mower frame and a drive assembly for rotating the cutting blades, pivotal arms supported on the mower frame and pivotally movable upward or downward, gauge members supported by the free ends of the pivotal arms, a single operating member operatively connected to the pivotal arms for pivotally moving the arms, and locking means for engageably or disengageably holding the operating member; the said pivotal arms comprise front and rear pivotal arms, and the front pivotal arms in a pair are pivoted to the opposed ends of the mower frame respectively, the gauge members being supported by the front ends of the front pivotal arms and the rear ends of the rear pivotal arms respectively, the operating member being operatively connected to the pivotal arms at the other ends thereof and the pivotal arms being upwardly or downwardly movable by the single operating member; the cutting blades being upwardly or downwardly movable to an adjusted position by the pivotal arms moved by the operating member with the gauge members in engagement with the ground, the cutting blades being retainable in the adjusted position by the locking means; at least one of the gauge members being supported by the rear pivotal arm and each of the gauge members supported by the front pivotal arms being supported by the corresponding pivotal arm with a vertical rod and being idly turnable about the vertical rod, and the mower further comprises auxiliary links extending in parallel to the front pivotal arms further connecting the gauge members to the mower frame, the front pivotal arms and the auxiliary links constituting parallel links to permit the vertical rod to retain its axis in the same vertical position when the cutting blades are moved upward or downward with the mower frame by the movement of the operating member.

2. A mower as defined in claim 1, wherein each of the gauge members is a gauge wheel rotatable about a horizontal shaft attached to said vertical rod.

3. A mower as defined in any one of claims 1 or 2 wherein the mower frame is provided with wheels on horizontal shafts to hold the cutting blades out of contact with the ground and maintain a minimum spacing therebetween by the contact of the wheels with the ground.

4. A mower mounted on a vehicle and including a mower frame attached to the bottom of the body of the vehicle, cutting blades rotatably supported by the mower frame and a drive assembly for rotating the cutting blades, pivotal arms supported on the mower frame and pivotally movable upward or downward, gauge members supported by the free ends of the pivotal arms, an operating member operatively connected to the pivotal arms for pivotally moving the arms, and locking means for engageably or disengageably holding the operating member, the cutting blades being upwardly or downwardly movable to an adjusted position by the pivotal arms moved by the operating member with the gauge members in engagement with the ground, the cutting blades being retainable in the adjusted position by the locking means; the mower frame being attached to the bottom of the vehicle body by a vertically collapsible lifting link assembly, the lifting link assembly having a pair of lifting link mechanisms supported on opposite sides of the body and a lifting hydraulic cylinder each lifting link mechanism comprising a pair of front and rear upper links pivoted by a pin to the body at an upper end thereof, lower links pivoted to the mower frame by pins at a lower end thereof, and a connecting rod turnably interconnecting lower ends of the upper links and upper ends of the lower links, said lifting hydraulic cylinder being connected between the pair of said connecting rods; the mower frame being upwardly or downwardly movable by flexing of lifting link mechanisms through stretching or collapsing of the lifting hydraulic cylinder.

5. A mower as defined in claim 4 wherein the drive assembly includes a transmission box mounted on and projecting from the mower frame, the transmission box being positioned at one side of the vehicle body outwardly thereof so as not to interfere with the vehicle body when the mower frame is lifted.

6. A mower as defined in claim 4 wherein each of the gauge members is a gauge wheel rotatable about a horizontal shaft.

7. A mower as defined in claim 4 or 5 wherein the mower frame is provided with wheels on horizontal shafts to hold the cutting blades out of contact with the ground and maintain a minimum spacing therebetween by the contact of the wheels with the ground.

* * * * *